UNITED STATES PATENT OFFICE.

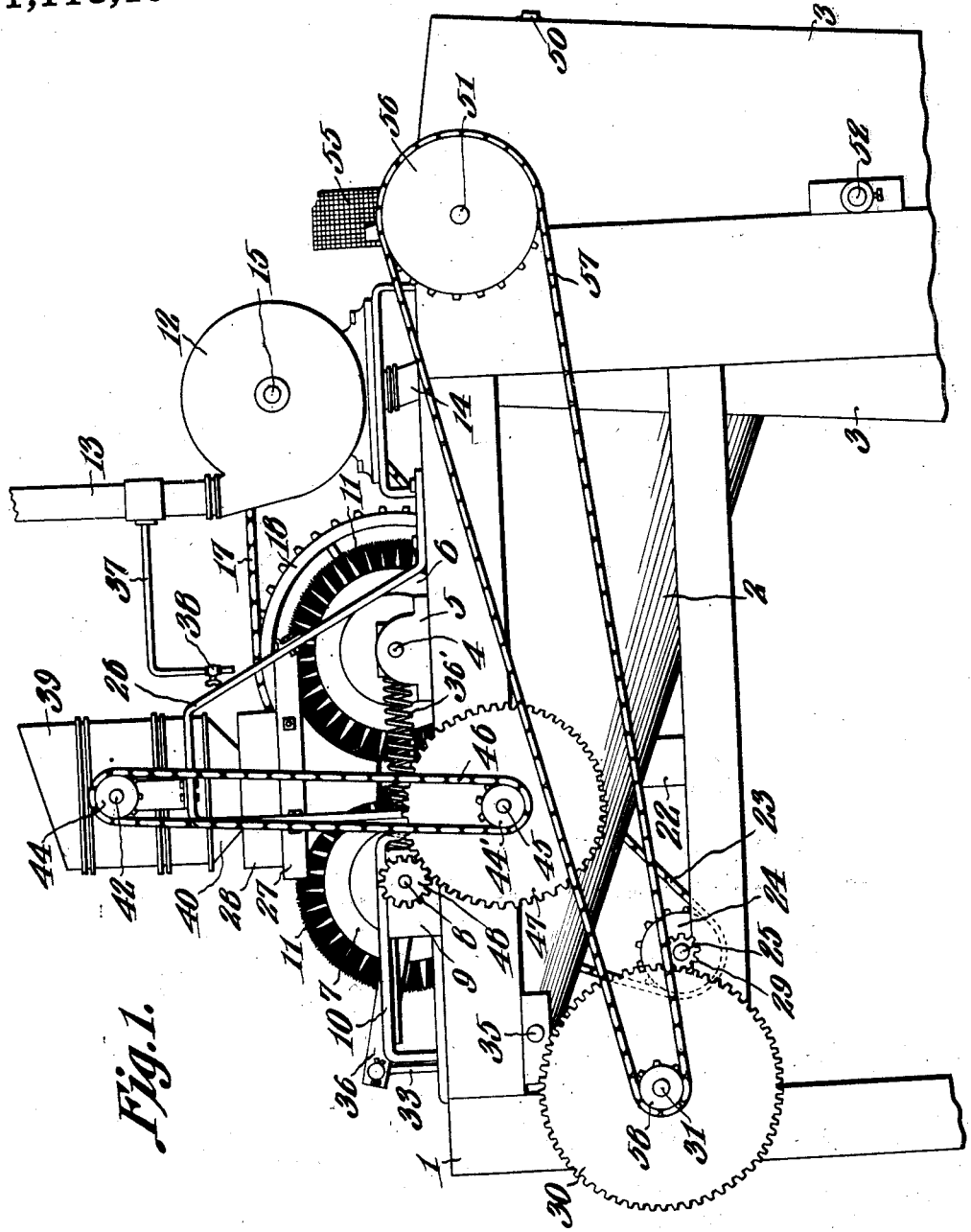

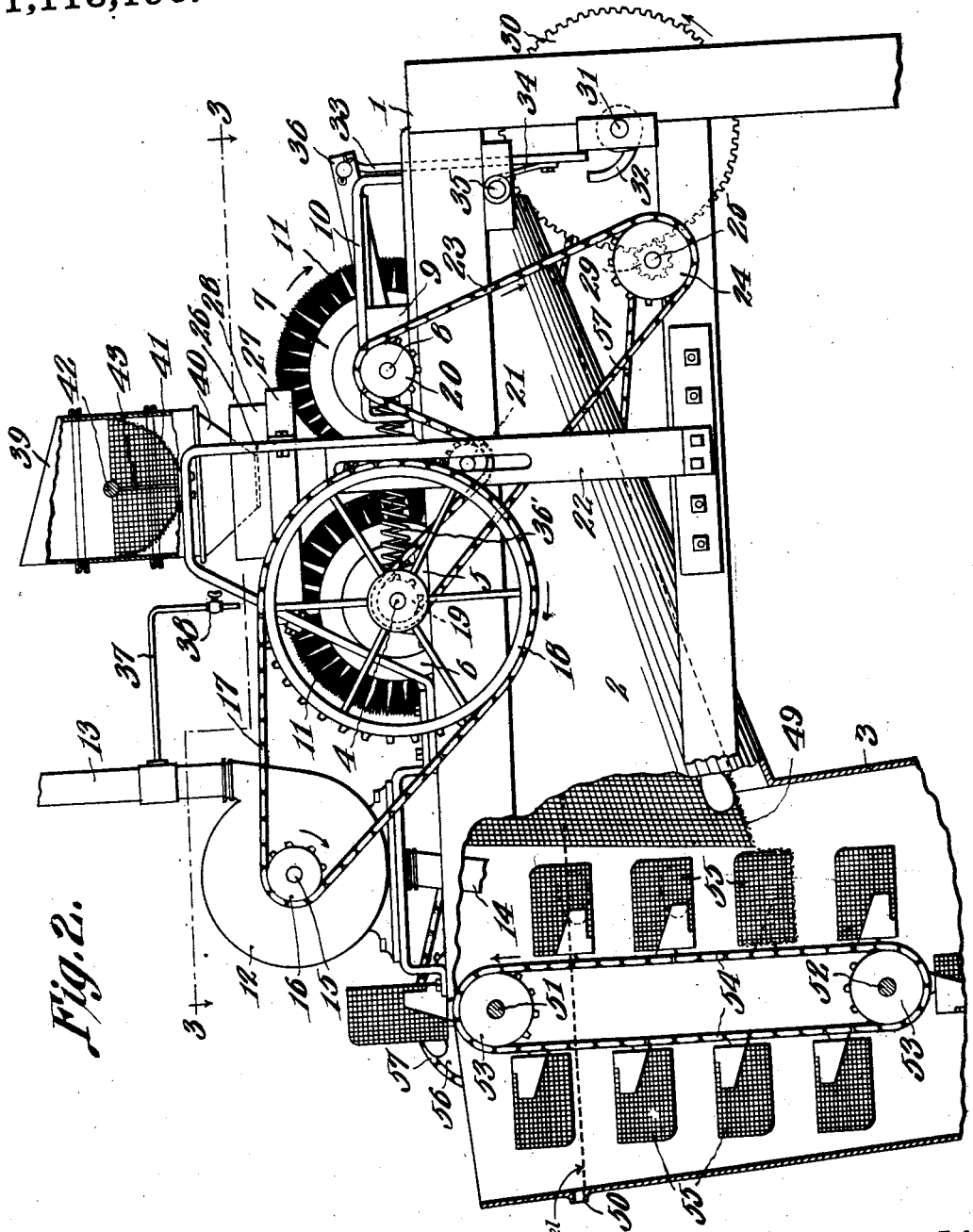

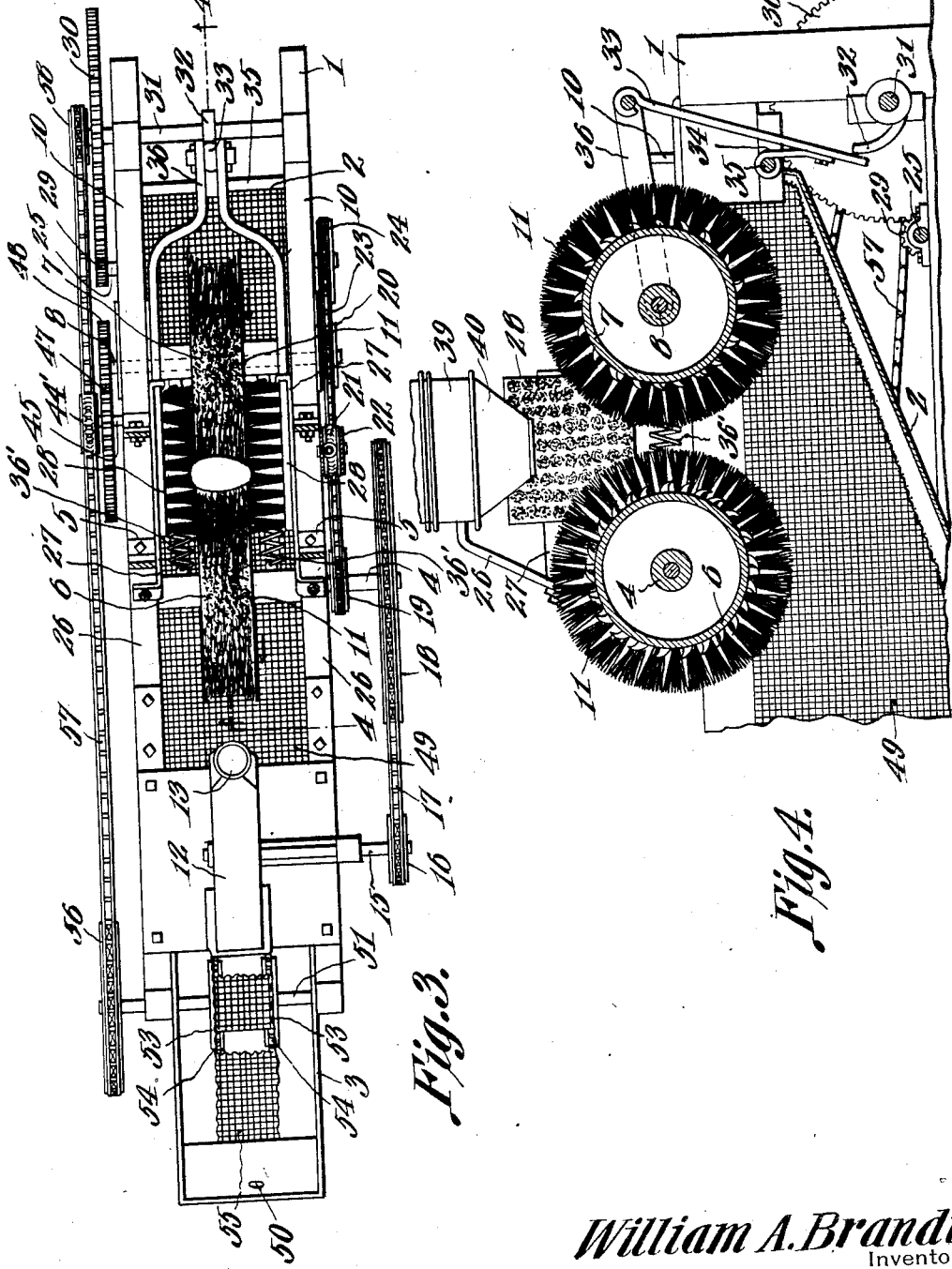

WILLIAM A. BRANDT, OF HEALDSBURG, CALIFORNIA.

EGG WASHING AND RINSING MACHINE.

1,113,190.  Specification of Letters Patent.  Patented Oct. 13, 1914.

Application filed May 18, 1914. Serial No. 839,379.

*To all whom it may concern:*

Be it known that I, WILLIAM A. BRANDT, a citizen of the United States, residing at Healdsburg, in the county of Sonoma and State of California, have invented a new and useful Egg Washing and Rinsing Machine, of which the following is a specification.

The present invention appertains to a washing and rinsing machine, and aims to provide a novel and improved apparatus of that nature, particularly adapted for washing and rinsing eggs.

The present invention contemplates the provision of a washing and rinsing machine embodying a unique assemblage of component parts, and operable in a practical manner, for the purposes intended.

As a more specific object, the present invention aims to provide in a machine of the nature indicated, means for thoroughly brushing or scrubbing the eggs and simultaneously applying water and washing powder thereto, then automatically dropping the successive eggs into a rinsing tank, and then conducting or elevating the eggs out of the rinsing tank to be placed upon a drying table, or the like.

With the foregoing and other objects in view, which will be apparent as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiment in the accompanying drawings, wherein:— .

Figure 1 is a side elevation of the improved machine, portions being broken away. Fig. 2 is an elevation taken from the opposite side, portions being broken away. Fig. 3 is a plan view of the machine, parts being shown in section, and the section being taken on the line 3—3 of Fig. 2. Fig. 4 is a longitudinal section, taken on the line 4—4 of Fig. 3, and illustrating one of the rotary brushes retracted from the other rotary brush, for releasing the egg.

In carrying out the present invention, there is provided a suitable frame 1, between the sides of which is hung or supported a reservoir 2, which has its bottom inclined from one end of the frame 1 to the other, the rinsing tank 2 being preferably transversely concaved. The tank 2 is provided at its deepest end, with an upright portion 3 within which the elevator operates, as will hereinafter appear in detail. The upright portion 3 at one end of the tank 2 is disposed between the corresponding end portions of the sides of the frame 1, and the bottom of the tank 2 is inclined from the portion 3 to the other end of the frame.

The brushing or scrubbing device for washing or cleaning the eggs, includes a transverse shaft 4 journaled through bearings or pillow blocks 5 secured upon the sides of the frame 1 above the intermediate portion of the tank 2, a circular brush 6 being secured or keyed upon the intermediate portion of the shaft 4. A second circular brush 7, which coöperates with the brush 6, is keyed or secured upon a transverse shaft 8 journaled through boxes or bearings 9 slidable longitudinally within guides 10 mounted upon the sides of the frame 1 adjacent one end of the frame. The boxes or bearings 9 are slidable longitudinally to and from the shaft 4, to carry the shaft 8 and its brush 7 longitudinally into and out of coöperative relation with the brush 6. The bristles 11 of the brushes 6 and 7 are provided with annular or circumferential grooves or channels, as most clearly seen in Fig. 3. This enables the bristles to conform to the curvature of the sides of the egg held between the said brushes with its major axis disposed transversely of the machine, as seen in Fig. 3.

As a mechanism for actuating the brushes 6 and 7, there is provided a prime mover, which is preferably in the form of a water motor 12 mounted over that end portion of the frame 1 remote from the guides 10, a water supply pipe 13 being connected to the motor 12, and the outlet or exhaust pipe 14 of the motor depending into the upright portion 3 of the rinsing tank 2, whereby the exhaust water of the motor will be discharged into the rinsing tank to be utilized for rinsing the eggs, and for continually supplying fresh water to the rinsing tank.

The rotor shaft 15 of the water motor 12 has a relatively small sprocket wheel 16 keyed or secured thereon, which sprocket wheel has an endless sprocket chain 17 trained thereover, and the said sprocket chain is trained over a relatively large sprocket wheel 18 keyed or secured upon the corresponding end of the brush shaft 4. Thus, the motor 12 will drive the brush shaft 4 directly, and in a counter-clockwise direction as seen in Fig. 1.

The brush 7 is operated from the brush shaft 4, there being a flexible connection between the brush shafts 4 and 8. To this end, a relatively small sprocket wheel 19 is keyed or secured upon the brush shaft 4 between the sprocket wheel 18 and the corresponding bearing 5, and a relatively small sprocket wheel 20 is keyed or secured upon the corresponding end of the brush shaft 8. An idler sprocket wheel 21 is mounted for rotary and vertically slidable movements within an upright guide 22 mounted upon the corresponding side of the frame 1 between the shafts 4 and 8, the idler sprocket wheel 21 being yieldably or spring-depressed in any suitable manner. An endless sprocket chain 23 is trained over the sprocket wheels 19 and 20, and has its upper run trained under the idler sprocket wheel 21. The lower run of the sprocket chain 23 between the sprocket wheels 19 and 20 is trained around or under a sprocket wheel 24 keyed to one end of a transverse counter shaft 25 journaled through the frame 1 below the shallow end of the tank 2. The idler sprocket 21 being yieldably depressed, will normally hold the sprocket chain 23 taut, whereby the sprocket chain will be maintained in operative engagement with the sprocket wheels 19, 20 and 24. The idler 21 will also enable the shaft 8 carrying the rotary brush 7, to move longitudinally away from and toward the brush shaft 4. Thus when the bearings or slides 9 are moved longitudinally within the guides 10, the upper run of the sprocket chain 23 may yield upwardly and downwardly, as necessary, due to the vertical motion of the idler 21 within the guide 22. In this manner, the brush shaft 8 will be continually driven from the brush shaft 4, notwithstanding the longitudinal position of the shaft 8 when the brush 7 is moved into and out of operative position relative to the companion brush 6.

Standards 26 embodying bars bent into arch-like form, are secured upon the sides of the frame 1 directly in rear of the guides 10 and over the bearings 5. Strips 27 are secured to the inner sides of the limbs of the standards 26 at the opposite sides of the machine, and brushes 28 for scrubbing or brushing the ends of the egg, are secured to the inner sides of the strips 27 and coöperate with the sides of the rotary brushes 6 and 7 to hold the egg between the rotary brushes, and to also contact with the ends of the egg.

A mechanism is provided for automatically retracting the rotary brush 7 away from the rotary brush 6, for the purpose of releasing the egg held between the said brushes, and to this end a relatively small pinion or spur gear 29 is keyed or secured upon that end of the counter shaft 25 remote from the sprocket wheel 24, the pinion 29 intermeshing with a relatively large spur gear 30 keyed upon the corresponding end of a transverse cam shaft 31 journaled to the corresponding end of the frame 1 adjacent the counter shaft 25. Mounted upon the intermediate portion of the cam shaft 31 is a cam or wiper arm 32 which coöperates with the lower end of a lever 33. The lever 33 has secured thereto, between its ends, a flexible member or leaf spring 34 which is pivoted or fulcrumed to the frame 1, to thereby fulcrum the lever 33 to the frame with the lower end or arm of the lever coöperating with the cam or wiper arm 32. The resilient member or spring 34 is preferably fulcrumed to the frame by means of a transverse rock shaft 35 terminally journaled to the sides of the frame.

The counter shaft 25 being rotated with the brush shafts 4 and 8, and the relatively small pinion 29 of the counter shaft 25 intermeshing with the relatively large spur gear 30 of the cam shaft 31, will cause the cam shaft to be rotated at a relatively slow velocity, to insure of the proper timing of the brush-retracting device. The upper end or arm of the retracting lever 33 is operatively connected to the brush shaft 8, through the medium of a pair of links 36 which are pivoted to the upper end of the lever 33 and which are loosely connected to the shaft 8 between the opposite sides of the brush 7 and the bearings or slides 9. Thus, the cam or wiper arm 32, which is rotated counter-clockwise, as seen in Fig. 2, is arranged to swing against and wipe along the lower arm of the lever 33, and to swing the upper arm of the said lever rearwardly, as seen in Fig. 4, at predetermined intervals.

The rotary brush 7, which is mounted for reciprocatory movement, and which is intermittently retracted from the brush 6, is normally held in coöperative relation with the brush 6, by means of a pair of retractile springs 36′ terminally connected to the brush shafts 4 and 8 between the respective brushes and the corresponding bearings 5 and 9. Thus, when the lever 33 is released, the brush 7 will be returned to initial or operative condition, through the influence of the springs 36′, the springs 36′ yielding when the lever 33 is swung by the cam or wiper arm 32.

The brush 6 is supplied with moisture, by means of a tube 37 connected to the water supply pipe 13 of the motor 12, the free end of the tube 37 overhanging the brush 6 and being provided with a suitable controlling valve 38. It is to be noted, in this connection, that that portion of the brush 6 adjacent the brush 7 moves downwardly, whereby the moisture or water will be carried immediately to the coöperating portions of the brushes. It is to be noted in this connection, that the brush 7 rotates clockwise as seen in Fig. 2, whereby that portion of the brush 7 adjacent the brush 6, will move upwardly, the brushes 6 and 7 rotating in the same direction, whereby their adjacent or coöperating portions will move in opposite directions to roll the egge about its major axis simultaneously with the brushing of the sides of the egg, which is held between the brushes 6 and 7.

The device for supplying the washing powder to the egg, embodies a washing powder bin or receptacle 39 mounted between the upper ends of the side standards 26, and having a hopper bottom 40 disposed immediately above the adjacent portions of the brushes 6 and 7. A concaved sieve or screen 41 is mounted within the bin or shell 39, and a transverse beater shaft 42 is journaled through the sides of the bin 39, in the manner of an ordinary flour sifter, a beater arm or arms 43 being mounted upon the shaft 42 within the bin 39 and being adapted to wipe or move along the sieve 41 for causing the washing powder disposed within the bin 39 to sift or gravitate through the sieve 41.

The agitating or beater shaft 42 is rotated at predetermined intervals, and to this end a sprocket wheel 44 is keyed or secured upon one end of the shaft 42, and a similar sprocket wheel 44' is keyed upon a stub shaft 45 journaled to one side of the frame 1, an endless sprocket chain 46 being trained over the sprocket wheels 44 and 44'. A relatively large spur gear 47 is also keyed upon the stub shaft 45, and is arranged to ordinarily intermesh with a relatively small gear or pinion 48 keyed upon that end of the brush shaft 8 remote from the sprocket wheel 20. Thus, when the brush 7 is in operative or initial position, the spur gear or pinion 48 of the brush shaft 8 will intermesh with the spur gear 47 to rotate the agitating or beater shaft 42 of the washing powder applying device. When the shaft 8 is moved rearwardly, however, the pinion or spur gear 48 will be disengaged from the spur gear 47, and consequently the movement of the shaft 42 will be stopped, as soon as the brush 7 is retracted from the brush 6, to prevent a waste of the washing powder. Thus, when the brushes 6 and 7 are in coöperative relation, the washing powder applying device will be brought into action, for dropping a charge or a predetermined number of charges of washing powder upon the egg held between the brushes 6 and 7.

Disposed within the tank 2 is a transversely curved and inclined screen 49, which is suspended in any suitable manner within the tank 2, and which serves as a false bottom or basket for catching the eggs dropped into the rinsing tank from between the brushes 6 and 7, and to cause the eggs to roll downward toward and into the upright elevator portion 3 of the rinsing tank. The screen 49 is sufficiently flexible or yieldable to prevent injury to the eggs, it being apparent that the water within the rinsing tank will serve to cushion the eggs as they are dropped from the brushes 6 and 7.

The tank 2 is provided with a drain outlet 50 at one end, for permitting the rinsing water to be discharged, and to maintain the level of the rinsing water at the proper point, as seen in Fig. 2.

The elevator for raising or conveying the eggs out of the rinsing tank, is mounted within the upright portion 3 of the rinsing tank, and embodies upper and lower transverse shafts 51 and 52, respectively, journaled through the sides of the upright portion 3 of the rinsing tank. Pairs of sprocket wheels 53 are keyed or secured upon the shafts 51 and 52, and endless sprocket chains 54 are trained over the upper and lower sprocket wheels 53, and have secured thereto, a series of meshed wire buckets or receptacles 55 which are coöperable with the lower end of the screen or chute 49.

The elevator is actuated by means of a relatively large sprocket wheel 56 keyed upon one end of the upper shaft 51 and having an endless sprocket chain 57 trained thereover, the sprocket chain 57 being trained over a relatively small sprocket wheel 58 upon the cam shaft 31 adjacent the gear 30. In this manner, the elevator will be actuated at the proper velocity, for the purposes, those runs of the elevator chains 54 adjacent the screen or chute 49, moving upwardly to carry the buckets 55 in the proper direction. The buckets will thus be moved upwardly along the lower or discharge end of the screen or chute 49 for catching eggs delivered from the screen or chute 49 and conducting the eggs upwardly out of the rinsing water whereby the eggs will be discharged from the buckets 55 as they move over the upper sprocket wheels 53, the eggs being readily caught or removed by hand, so as to be applied to a drying table or rack, (not shown). In operation, the eggs are preferably first soaked in any suitable soaking solution, and are then introduced into the washing and rinsing machine.

The eggs are deposited by hand, one at a time, between the brushes 6 and 7. Supposing the brushes 6 and 7 to be in coöperative relation, an egg is deposited therebetween, and will be supported thereby due to the fact that the adjacent portions of the brushes are relatively close together.

The egg will have its major axis disposed transversely, in order that the ends of the egg will engage the stationary brushes 28 for brushing or cleaning the ends of the egg. The adjacent portions of the rotary brushes 6 and 7, moving in opposite directions, will turn or roll the egg whereby all sides of the egg will be thoroughly brushed or scrubbed. As the egg is being brushed, water will be applied to the brushes 6 and 7 and to the egg, by the tube 37, as above indicated, and a quantity of the washing powder will also be applied to the adjacent portions of the brushes 6 and 7 and to the egg, due to the actuation of the agitator or beater 43 when the brush 7 is in operative or normal condition, as above pointed out.

After the brushes 6 and 7 have rotated a predetermined number of revolutions, the cam or wiper arm 32 having moved through one revolution, will cause the brush 7 to be retracted from the brush 6, to drop the egg into the rinsing tank automatically. This result is due from the fact that the cam or wiper arm 32 in rotating once for every predetermined number of revolutions of the brushes 6 and 7, will intermittently engage the retracting lever 33 so as to draw the brush 7 away from the brush 6 against the tension of the returning springs 36'. Simultaneously with the retraction of the brush 7, the washing powder applying device will be brought to idle condition, due to the disengagement of the pinion 48 from the spur gear 47, as above described. As soon as the cam or wiper arm 42 has passed the lever 33 and released the same, the brush 7 will be returned to operative position, by the returning springs 36', as will be obvious. The next or succeeding egg is then dropped between the brushes 6 and 7, in which event the foregoing operation will be repeated or resumed.

As the eggs are dropped, one at a time, into the rinsing tank 2, they will be rinsed, to free them of the washing powder, suds and foreign matter, the gravitation of the eggs to the bottom of the rinsing tank, being retarded by the water which serves as a cushion for the eggs. The eggs will therefore be deposited lightly upon the chute or screen 49 and will roll down the chute toward the elevator. The buckets 55 of the elevator being moved upwardly along the discharge end of the chute 49 will catch the eggs as they are discharged one at a time from the chute 49 and will convey the eggs upwardly out of the rinsing water where they may be readily caught or removed by hand and applied to a drying table or rack (not shown).

From the foregoing, taken in connection with the drawings, the advantages and capabilities of the present apparatus will be obvious to those versed in the art, it being observed that the handling of the eggs is entirely automatic from the time the eggs are deposited between the brushes, to the time the eggs are taken from the elevator. The various devices are also properly timed, to insure of the proper coöperation between the various devices, for properly carrying out the desired functions.

Having thus described the invention, what is claimed as new is:—

1. In a machine of the character described, coöperating brushes adapted to hold an article to be brushed therebetween, means for intermittently separating the brushes, and actuating means connected to the said brushes and the said means.

2. In a machine of the character described, a pair of brushes adapted to hold an article to be cleaned therebetween, one brush being slidably mounted to move to and from the other brush, retracting means operatively connected to the slidably mounted brush, and actuating means operatively connected to the brushes and to the said retracting means.

3. In a machine of the character described, coöperable brushes, one brush being movable to and from the other, a retracting lever operably connected to the said movable brush, and a rotary cam coöperable with the said lever for intermittently retracting the movably mounted brush from the other brush.

4. In a machine of the character described, coöperating brushes, one brush being slidable to and from the other, a retracting lever operatively connected to the slidably mounted brush, a rotary cam coöperating with the said lever to intermittently retract the slidably mounted brush from the other brush, and actuating means operatively connected to the brushes and to the said cam.

5. In a machine of the character described, a pair of rotary brushes, one of the brushes being mounted to move to and from the other, means for intermittently retracting the movably mounted brush from the other brush, and actuating means operably connected to the brushes for continually rotating them.

6. In a machine of the character described, coöperable rotary brushes, one brush being mounted for movement to and from the other brush, a retracting device operably connected to the movably mounted brush, and actuating means including a flexible connection between the brushes and operably connected to the said retracting device.

7. In a machine of the character described, a pair of coöperable rotary brushes, one brush having a shaft mounted for sliding movements to and from the other brush, a retracting lever operably connected to the said shaft, and a rotary cam coöperable with the said lever for intermittently retracting the said shaft.

8. In a machine of the character described, a pair of coöperable rotary brushes, one brush having a shaft mounted for movement to and from the other brush, a retracting lever, links connecting the said lever and the said shaft, and a cam mounted for rotary movement and coöperable with the said lever.

9. In a machine of the character described, a pair of coöperable rotary brushes, one brush being mounted for movement to and from the other, yieldable means for holding the movably mounted brush in coöperative relation with the other brush, a retracting device operably connected to the movably mounted brush, and actuating means operably connected to the said retracting device and including a flexible connection between the said brushes.

10. In a machine of the character described, coöperable separable brushes, means for separating the brushes, a washing powder applying device mounted above the brushes, actuating means for the brushes, and means for operably connecting and disconnecting the said applying device to and from the actuating means respectively, when the brushes are in coöperative and separated positions.

11. In a machine of the character described, coöperable rotary brushes, one brush being mounted for movement to and from the other brush, retracting means operably connected to the movably mounted brush, actuating means operably connected to the retracting means and including a flexible connection between the brushes, a washing powder applying device mounted above the adjacent portions of the brushes, and means for operably connecting and disconnecting the said applying device to and from the movably mounted brush, respectively, when the movably mounted brush is in coöperation with the other brush and retracted therefrom, respectively.

In testimony that I claim the foregoing as my own, I have hereto affixed my signature in the presence of two witnesses.

WILLIAM A. BRANDT.

Witnesses:
CLARA A. JONES,
E. M. NORTON.